US012259830B2

(12) United States Patent
Maekawa et al.

(10) Patent No.: US 12,259,830 B2
(45) Date of Patent: Mar. 25, 2025

(54) DEVICE AND METHOD

(71) Applicants: TOYOTA JIDOSHA KABUSHIKI KAISHA, Toyota (JP); National University Corporation YOKOHAMA National University, Yokohama (JP)

(72) Inventors: Yosuke Maekawa, Chiyoda-ku (JP); Camille Gay, Chiyoda-ku (JP); Tsutomu Matsumoto, Yokohama (JP)

(73) Assignees: TOYOTA JIDOSHA KABUSHIKI KAISHA, Toyota (JP); National University Corporation YOKOHAMA National University, Yokohama (JP)

( * ) Notice: Subject to any disclaimer, the term of this patent is extended or adjusted under 35 U.S.C. 154(b) by 80 days.

(21) Appl. No.: 18/456,641

(22) Filed: Aug. 28, 2023

(65) Prior Publication Data
US 2024/0070097 A1   Feb. 29, 2024

(30) Foreign Application Priority Data
Aug. 30, 2022   (JP) .................... 2022-136847

(51) Int. Cl.
*G06F 13/20* (2006.01)
*H04L 12/40* (2006.01)

(52) U.S. Cl.
CPC .............. *G06F 13/20* (2013.01); *H04L 12/40* (2013.01); *G06F 2213/36* (2013.01); *H04L 2012/40215* (2013.01)

(58) Field of Classification Search
CPC ..... G06F 13/20; G06F 2213/36; H04L 12/40; H04L 2012/40215
See application file for complete search history.

(56) References Cited

U.S. PATENT DOCUMENTS

| | | | |
|---|---|---|---|
| 10,884,966 B2* | 1/2021 | Mosko | G06F 13/4027 |
| 12,155,504 B2* | 11/2024 | Isoyama | H04L 12/40 |
| 2015/0020152 A1* | 1/2015 | Litichever | H04L 63/14 726/1 |
| 2020/0174958 A1* | 6/2020 | Mosko | H04L 12/40032 |
| 2021/0328931 A1* | 10/2021 | Xian | H04L 67/12 |
| 2022/0321583 A1* | 10/2022 | Kneib | H04L 63/1416 |
| 2023/0013966 A1* | 1/2023 | Zeng | H04L 12/4604 |

FOREIGN PATENT DOCUMENTS

JP       5-48612 A       2/1993

* cited by examiner

*Primary Examiner* — Henry Tsai
*Assistant Examiner* — Christopher A Daley
(74) *Attorney, Agent, or Firm* — Oblon, McClelland, Maier & Neustadt, L.L.P.

(57) ABSTRACT

A device includes a first interface unit connected to a first controller area network (CAN) bus, a second interface unit connected to a second CAN bus, and a control unit configured to identify, in a case where transmission of a CAN frame is started, a CAN bus detected to be in a dominant state first after end of arbitration from the first CAN bus or the second CAN bus, as a CAN bus to which a transmission source device of the CAN frame is connected.

5 Claims, 6 Drawing Sheets

DEVICE AND METHOD

CROSS REFERENCE TO RELATED APPLICATION

This application claims the benefit of Japanese Patent Application No. 2022-136847, filed on Aug. 30, 2022, which is hereby incorporated by reference herein in its entirety.

BACKGROUND

Technical Field

The present disclosure relates to a controller area network (CAN).

Description of the Related Art

There is disclosed an inter-LAN connection device that calculates an address of a transmission path destination of a received frame by using route information registering a transmission path of a frame, and that transmits the received frame to a transmission path indicated by the route information that is registered in an address conversion table indicated by the calculated address (for example, Patent Document 1).

[Patent Document 1] Japanese Patent Laid-Open No. 5-048612

SUMMARY

The present disclosure is aimed at providing a device and a method that are capable of increasing a security level of a CAN.

An aspect of the present disclosure is a device including:
a first interface unit connected to a first controller area network (CAN) bus;
a second interface unit connected to a second CAN bus; and
a control unit configured to identify, in a case where transmission of a CAN frame is started, a CAN bus detected to be in a dominant state first after end of arbitration from the first CAN bus or the second CAN bus, as a CAN bus to which a transmission source device of the CAN frame is connected.

Another aspect of the present disclosure is a method performed by a device connected to a first controller area network (CAN) bus and a second CAN bus, the method comprising:
detecting start of transmission of a CAN frame; and
identifying, in a case where transmission of the CAN frame is started, a CAN bus detected to be in a dominant state first after end of arbitration from the first CAN bus or the second CAN bus, as a CAN bus to which a transmission source device of the CAN frame is connected.

According to the present disclosure, a security level of the CAN may be increased.

DESCRIPTION OF THE EMBODIMENTS

Figure 1:
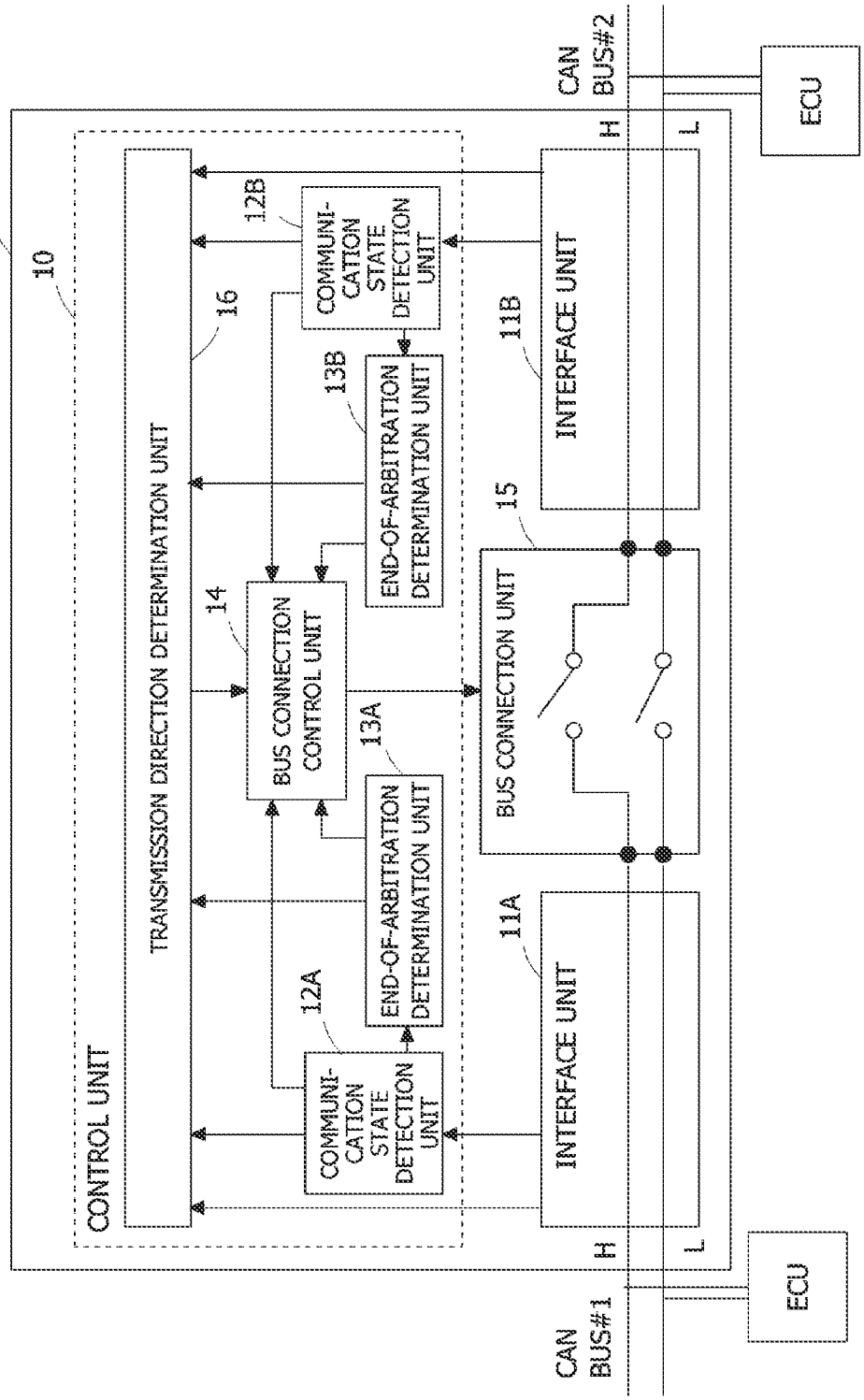
FIG. 1 is a diagram illustrating an example of a configuration of a transmission source detection device according to a first embodiment.

With a CAN, because information that allows identification of a transmission source is not included in a message, a transmission or reception direction of a CAN frame is difficult to identify. Accordingly, for example, it is difficult to prevent an attack such as transmission of a spoofed message by malicious equipment that is connected to a CAN bus.

An aspect of the present disclosure is a device including a first interface unit connected to a first CAN bus, a second interface unit connected to a second CAN bus, and a control unit. The control unit is configured to identify, in a case where transmission of a CAN frame is started, a CAN bus detected to be in a dominant state first after end of arbitration from the first CAN bus and the second CAN bus, as a CAN bus to which a transmission source device of the CAN frame is connected.

With CAN buses, in a case where CAN frames are simultaneously transmitted by a plurality of devices, a device that performs message transmission is determined based on a level of priority associated with a CAN ID. The device that performs CAN frame transmission is determined after a period of arbitration after start of CAN frame transmission. A state of a CAN bus when there is no communication is a recessive state, and the dominant state is a state that occurs only during transmission of the CAN frame. Accordingly, in an aspect of the present disclosure, in a case where transmission of a CAN frame is started, a CAN bus to which the transmission source device of the CAN frame is connected may be identified by identifying the CAN bus that is placed in the dominant state first after end of the arbitration.

The device according to the aspect of the present disclosure may further include a connection unit configured to perform connection and disconnection between the first interface unit and the second interface unit. The control unit may output a connection instruction to the connection unit in a case where transmission of the CAN frame is started. The control unit may output a disconnection instruction to the connection unit in a case where end of the arbitration is detected, and may then output the connection instruction to the connection unit, in a case where the dominant state of the first CAN bus or the second CAN bus is detected.

By dividing one CAN bus into the first CAN bus and the second CAN bus, an electrical change at a time of reception of a CAN frame from any one CAN bus may be captured. When transmission of a CAN frame is started, the first CAN bus and the second CAN bus are connected, and thus, same electrical characteristics are obtained for the first CAN bus and the second CAN bus, and disruption of communication through the CAN bus may be prevented. Furthermore, by temporarily disconnecting the connection between the first CAN bus and the second CAN bus after end of the arbitration, a CAN bus where there is an electrical change due to transmission of a CAN frame from a device, transmission of a CAN frame from which is fixed, may be identified. Accordingly, the CAN bus to which the transmission source device of the CAN frame is connected may be identified.

In the aspect of the present disclosure, the control unit may detect end of the arbitration for the CAN frame based on lapse of a time length corresponding to 13 bits after detection of start of transmission of the CAN frame. In a format of a CAN frame, 1 bit at a beginning is a start of frame (SOF) field, the next 11 bits are a CAN ID field, and the next 1 bit is an RTR field. The arbitration is performed based on CAN ID and RTR. Accordingly, by waiting for lapse of a time length corresponding to 13 bits after detection of start of transmission of the CAN frame, end of the arbitration may be detected more accurately and by a simpler configuration.

In the aspect of the present disclosure, in a case where the first CAN bus or the second CAN bus that is identified as a CAN bus to which a transmission source device of a first CAN frame is connected is not registered as a legitimate CAN bus for transmission of the first CAN frame, the control unit may output the disconnection instruction to the connection unit. For example, in the case where a device that transmits a CAN frame is not connected to the first CAN bus, or in the case where an association between the first CAN bus and the first CAN frame is not included in an association between a CAN bus and a CAN frame that is transmitted from the CAN bus, or in the case where transmission of the first CAN frame from the first CAN bus is not detected in past, if reception of the first CAN frame from the first CAN bus is detected, the first CAN bus and the second CAN bus are disconnected. Accordingly, a suspicious CAN frame may be prevented from being transmitted from a CAN bus to which the transmission source device is connected to the other CAN bus, and influence of transmission of a suspicious CAN frame may be suppressed.

Another aspect of the present disclosure may be identified as a method of performing the processes described above by the device described above. Other aspects of the present disclosure may be identified as a program for causing a computer to perform the processes of the device described above, and a non-transitory computer-readable recording medium storing the program.

In the following, embodiments of the present disclosure will be described with reference to the drawings. The configuration of the embodiments described below are examples, and the present disclosure is not limited to the configuration of the embodiments.

First Embodiment

FIG. 1 is a diagram illustrating an example of a configuration of a transmission source detection device 1 according to a first embodiment. The transmission source detection device 1 is a device that is mounted on a vehicle, and is connected to a CAN bus. Other devices mounted on the vehicle, such as an electronic control unit (ECU), are also connected to the CAN bus. The CAN bus is divided into two, and the transmission source detection device 1 is connected to a CAN bus ∩1 and a CAN bus ∩2 that are divided from each other. The transmission source detection device 1 is a device that detects from which of devices connected to the CAN bus ∩1 and the CAN bus ∩2 a CAN frame is transmitted. In the following, the CAN bus to which a transmission source device of the CAN frame is connected will be referred to as a transmission source CAN bus.

The transmission source detection device 1 includes a control unit 10, an interface unit 11, and a bus connection unit 15. The control unit 10 includes a communication state detection unit 12, an end-of-arbitration determination unit 13, a bus connection control unit 14, and a transmission direction determination unit 16. The interface unit 11, the communication state detection unit 12, and the end-of-arbitration determination unit 13 are provided for each CAN bus. In FIG. 1, "A" is attached at an end of a reference sign of a component provided for the CAN bus ∩1. In relation to a component provided for the CAN bus ∩2, "B" is attached at an end of the reference sign. Components in relation to the CAN buses having a common reference sign have a same configuration. Accordingly, when not distinguishing between the two, "A" or "B" at the end of the reference sign is omitted. In the following, when not distinguishing between the two, a CAN bus that is a processing target of a component will be referred to as a target CAN bus.

The interface unit 11 is an interface that is connected to the target CAN bus. The CAN bus is formed from two signal lines, and signals of different voltages flow through the signal lines. A signal line where a signal flows at a high voltage in a dominant state is indicated by "H" in the drawing. A signal line where a signal flows at a low voltage in the dominant state is indicated by "L" in the drawing. Whether the target CAN bus is in a recessive state or in the dominant state is determined based on a voltage difference between the two signal lines. The interface unit 11 notifies the communication state detection unit 12 and the transmission direction determination unit 16 of whether the target CAN bus is in the recessive state or the dominant state.

The communication state detection unit 12 detects, in relation to the target CAN bus, start of transmission of a CAN frame and end of transmission of the CAN frame, based on a state of the target CAN bus from the interface unit 11. More specifically, the communication state detection unit 12 detects start of transmission of a CAN frame when the target CAN bus is placed in the dominant state. Furthermore, the communication state detection unit 12 detects end of transmission of the CAN frame or end of transmission of an error frame when the recessive state of the target CAN bus continues for a time length corresponding to 7 bits. The communication state detection unit 12 notifies the end-of-arbitration determination unit 13, the bus connection control unit 14, and the transmission direction determination unit 16 of start and end of transmission of the CAN frame.

When notified by the communication state detection unit 12 of start of transmission of the CAN frame, the end-of-arbitration determination unit 13 starts a timer, and detects end of the arbitration when the timer expires. A time length of the timer is a time length corresponding to a total bit length (13 bits) of fields of the CAN frame including SOF (1 bit), CAN ID (11 bits), and RTR (1 bit). When end of the arbitration is detected, the end-of-arbitration determination unit 13 notifies end of the arbitration to the bus connection control unit 14 and the transmission direction determination unit 16.

The transmission direction determination unit 16 identifies the transmission source CAN bus of the CAN frame based on notifications about the CAN bus ∩1 and the CAN bus ∩2, the notifications being about the state of the CAN bus, end of transmission of the CAN frame, and end of the arbitration. More specifically, the transmission direction determination unit 16 identifies, as the transmission source CAN bus, the CAN bus ∩1 or the CAN bus ∩2 in relation to which the dominant state is detected first after end of the arbitration. The transmission direction determination unit 16 outputs information about the transmission source CAN bus to the bus connection control unit 14.

The bus connection control unit 14 outputs a connection instruction or a disconnection instruction for the CAN bus ∩1 and the CAN bus ∩2 to the bus connection unit 15, based on the notification about start of transmission of the CAN frame, the notification about end of the arbitration, and information about the transmission source CAN bus for each of the CAN bus ∩1 and the CAN bus ∩2. More specifically, when the notification about start of transmission of the CAN frame is input, the bus connection control unit 14 outputs the connection instruction to the bus connection unit 15. When the notification about end of transmission of the CAN frame is input, the bus connection control unit 14 outputs the disconnection instruction to the bus connection unit 15. When the notification about end of the arbitration is input, the bus connection control unit 14 outputs the disconnection instruction to the bus connection unit 15. When the notification indicating the dominant state is input from one of the CAN bus ∩1 or the CAN bus ∩2 after end of the arbitration, the bus connection control unit 14 outputs the connection instruction to the bus connection unit 15.

The bus connection unit 15 includes a switch for connecting the CAN bus ∩1 and the CAN bus ∩2, for each of the two signal lines. The switch provided in the bus connection unit 15 is a normally open, DPST (Double Pole Single Throw)-type CMOS (Complementary Metal Oxide Semiconductor) analog switch, for example. When the connection instruction or the disconnection instruction is input from the bus connection control unit 14, the bus connection unit 15 turns ON or OFF the two switches, and connects or disconnects the CAN bus ∩1 and the CAN bus ∩2.

The control unit 10, the interface unit 11, and the bus connection unit 15 may each be implemented by an electronic circuit. Alternatively, the control unit 10 is not limited to this and may be a processor such as a central processing unit (CPU), and the communication state detection unit 12, the end-of-arbitration determination unit 13, the bus connection control unit 14, and the transmission direction determination unit 16 may be functional modules that are implemented by execution of predetermined programs by the processor, for example. In the following, a description will be given of a case where the control unit 10 is implemented by an electronic circuit.

Figure 2:
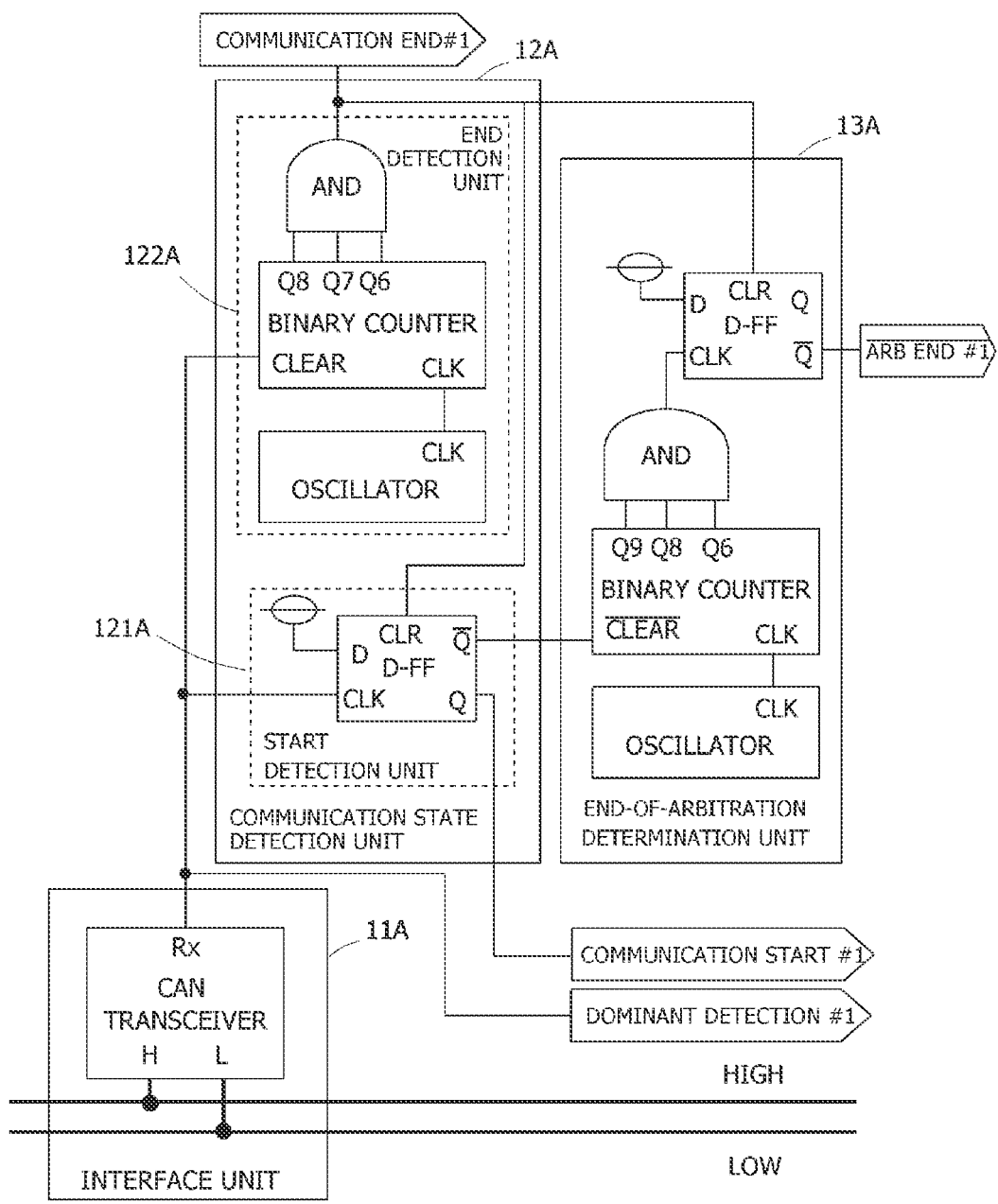
FIG. 2 is an example of a circuit diagram of the interface unit, the communication state detection unit, and the end-of-arbitration determination unit.

FIG. 2 is an example of a circuit diagram of the interface unit 11A, the communication state detection unit 12A, and the end-of-arbitration determination unit 13A. The interface unit 11A includes a transceiver that is connected to the two signal lines forming the CAN bus ∩1. In the case where the voltage difference between the two signal lines is smaller than a predetermined value, the CAN bus ∩1 is in the recessive state. In the case where the voltage difference between the two signal lines is equal to or greater than the predetermined value, the CAN bus ∩1 is in the dominant state. A High signal is output in the dominant state and a Low signal is output in the recessive state, from an RX terminal of the transceiver of the interface unit 11A. Output of the High signal from the RX terminal of the transceiver of the interface unit 11A indicates a notification about detection of the dominant state for the CAN bus ∩1 (in the drawing, "dominant detection ∩1").

The communication state detection unit 12A includes a start detection unit 121A and an end detection unit 122A. The start detection unit 121A detects start of transmission of the CAN frame through the CAN bus ∩1. The start detection unit 121A includes a D flip flop circuit (hereinafter "D-FF"). In the first embodiment, with respect to the D-FF in FIG. 2 and a subsequent drawing, the High signal is constantly input to a D terminal, and when input to a clock terminal (in the drawing, "CLK") rises from the Low signal to the High signal, the High signal is output from a Q terminal thereafter regardless of an input value of the clock terminal. With the D-FF, when the High signal is input to a clear terminal (in the drawing, "CLR"), an output value of the Q terminal returns to the Low signal in an initial state.

The D-FF of the start detection unit 121A takes an output signal of the interface unit 11A as an input to the clock terminal. Accordingly, when the CAN bus ∩1 transitions from the recessive state to the dominant state, the D-FF of the start detection unit 121A outputs the High signal from the Q terminal. Output of the High signal from the Q terminal of the D-FF of the start detection unit 121A may correspond to the notification about start of transmission of the CAN frame through the CAN bus ∩1 (in the drawing, "communication start ∩1").

The end detection unit 122A detects end of transmission of the CAN frame through the CAN bus ∩1. The end detection unit 122A includes an oscillator, a binary counter, and an AND circuit. The binary counter of the end detection unit 122A takes a clock signal of the oscillator as an input to a clock terminal, and takes an output signal of the interface unit 11A as an input to a clear terminal. Furthermore, to detect end of transmission of the CAN frame and to detect an error frame, the binary counter of the end detection unit 122A is set to count the number of clocks in a period corresponding to 7 bits. That is, the binary counter of the end detection unit 122A functions as a timer for a time length corresponding to 7 bits.

For example, in the case where the oscillator has a clock of 16 MHz, and communication speed of the CAN bus is 500 kbps, the number of counts of a clock signal in a period corresponding to 1 bit is 32. Accordingly, in this case, the binary counter of the end detection unit 122A counts 32×7 bits=224 (0b11100000) as the number of clocks in the period corresponding to 7 bits.

Accordingly, with the end detection unit 122A, when the CAN bus ∩1 is placed in the recessive state, the binary counter starts counting the clock, and when the number of counts reaches 7 bits, the High signal is output from the AND circuit. Output of the High signal from the AND circuit may correspond to the notification about end of transmission of the CAN frame through the CAN bus ∩1 (in the drawing, "communication end ∩1").

Here, the High signal corresponding to "communication end ∩1" from the end detection unit 122A is input to the clear terminal of the D-FF of the start detection unit 121A. Accordingly, when start of transmission of the CAN frame through the CAN bus ∩1 is detected, thereafter, the start detection unit 121A continues to output the High signal indicating the notification about start of transmission of the CAN frame, and outputs the Low signal when end of transmission of the CAN frame through the CAN bus ∩1 is detected.

The end-of-arbitration determination unit 13A includes an oscillator, a binary counter, an AND circuit, and a D-FF. The binary counter of the end-of-arbitration determination unit 13A takes a clock signal from the oscillator as an input to a clock terminal, and takes an inverted signal of output of the Q terminal of the start detection unit 121A as inversion of an input to a clear terminal. Furthermore, the binary counter of the end-of-arbitration determination unit 13A is set to count the number of clocks in a period corresponding to 13 bits, to detect end of the arbitration. That is, the binary counter of the end-of-arbitration determination unit 13A functions as an arbitration timer. For example, in the case where the oscillator has a clock of 16 MHz, and communication speed of the CAN bus is 500 kbps, the binary counter of the end-of-arbitration determination unit 13A counts 32×13 bits=416 (0b110100000) as the number of clocks in the period corresponding to 13 bits. That is, the binary counter of the end-of-arbitration determination unit 13A starts counting when start of transmission of the CAN frame through the CAN bus ∩1 is detected, and the High signal is output from the AND circuit when the number of counts corresponding to 13 bits is reached.

Furthermore, the D-FF of the end-of-arbitration determination unit 13A takes an output signal of the AND circuit as an input to a clock terminal, and takes an output signal of the end detection unit 122A as an input to a clear terminal. That is, the D-FF of the end-of-arbitration determination unit 13A starts output of the High signal from a Q terminal after a lapse of a period corresponding to 13 bits after detection of start of transmission of the CAN frame through the CAN bus ∩1, and outputs the Low signal from the Q terminal when end of transmission of the CAN frame is detected. Output of the High signal from the Q terminal of the D-FF of the end-of-arbitration determination unit 13A may correspond to the notification about end of the arbitration for the CAN frame transmitted through the CAN bus ∩1 (in the drawing, "ARB end ∩1").

As described above, the end-of-arbitration determination unit 13A waits for a period corresponding to 13 bits after detection of start of transmission of the CAN frame through the CAN bus ∩1, and outputs the notification about end of the arbitration for the CAN frame transmitted through the CAN bus ∩1.

Figure 3:
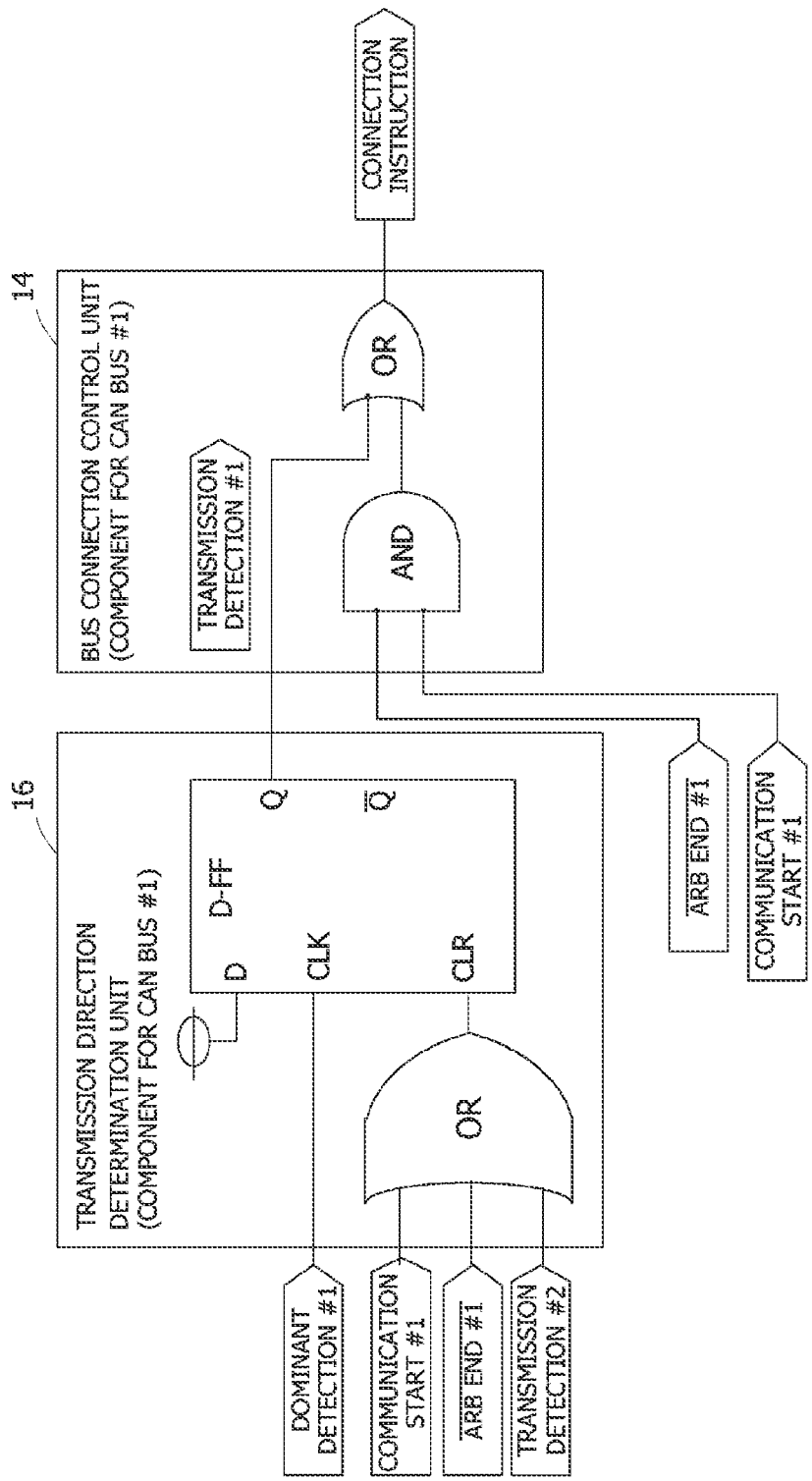
FIG. 3 is an example of a circuit diagram of the bus connection control unit and the transmission direction determination unit.

FIG. 3 is an example of a circuit diagram of the bus connection control unit 14 and the transmission direction determination unit 16. The circuit diagram illustrated in FIG. 3 is a configuration of the bus connection control unit 14 and the transmission direction determination unit 16 for the CAN bus ∩1, and the bus connection control unit 14 and the transmission direction determination unit 16 include same configuration also for the CAN bus ∩2.

As configuration for the CAN bus ∩1, the transmission direction determination unit 16 includes an OR circuit and a D-FF. The OR circuit of the transmission direction determination unit 16 takes, as inputs, an output signal of the end detection unit 122A, an inverted signal of output of the Q terminal of the D-FF of the end-of-arbitration determination unit 13, and a signal notifying that the CAN bus ∩2 is detected as the transmission source CAN bus (in the drawing, "transmission detection ∩2"). The D-FF circuit of the transmission direction determination unit 16 takes the output signal of the interface unit 11A as an input to a clock terminal, and takes an output signal of the OR circuit as an input to a clear terminal.

That is, the D-FF of the transmission direction determination unit 16 outputs the High signal from a Q terminal when the CAN bus ∩1 is placed in the dominant state in a period between end of the arbitration for a CAN frame at the CAN bus ∩1 and detection of end of transmission of the CAN frame, where the CAN bus ∩2 is not detected as the transmission source CAN bus. The High signal that is output from the Q terminal of the D-FF of the transmission direction determination unit 16 may correspond to the notification about detection of the CAN bus ∩1 as the transmission source CAN bus (in the drawing, "transmission detection ∩1").

As described above, the transmission direction determination unit 16 operates, in relation to the CAN bus ∩1, to identify the CAN bus ∩1 as the transmission source CAN bus when the CAN bus that is placed in the dominant state first after end of the arbitration for the CAN frame is the CAN bus ∩1. The transmission direction determination unit 16 also includes same components for the CAN bus ∩2, and operates, in relation to the CAN bus ∩2, to identify the CAN bus ∩2 as the transmission source CAN bus when the CAN bus that is placed in the dominant state first after end of the arbitration for the CAN frame is the CAN bus ∩2.

As components for the CAN bus ∩1, the bus connection control unit 14 includes an AND circuit and an OR circuit. The AND circuit of the bus connection control unit 14 takes, as inputs, the output signal of the start detection unit 121A and the inverted signal of output of the Q terminal of the D-FF of the end-of-arbitration determination unit 13. The OR circuit of the bus connection control unit 14 takes, as input signals, the output signal of the Q terminal of the D-FF of the transmission direction determination unit 16 for the CAN bus ∩1, and an output signal of the AND circuit of the bus connection control unit 14. That is, the OR circuit of the bus connection control unit 14 outputs the High signal in a period between start of transmission of the CAN frame through the CAN bus ∩1 and end of the arbitration, and in a period between identification of the CAN bus ∩1 as the transmission source CAN bus and end of transmission of the CAN frame. Output of the High signal from the OR circuit of the bus connection control unit 14 may correspond to the connection instruction for the bus connection unit 15. Output of the Low signal from the OR circuit of the bus connection control unit 14 may correspond to the disconnection instruction for the bus connection unit 15.

As described above, in relation to the CAN bus ∩1, the bus connection control unit 14 outputs the connection instruction after detection of start of transmission of the CAN frame, and outputs the disconnection instruction when end of the arbitration is detected, and then, outputs the connection instruction when the dominant state is detected. The bus connection control unit 14 also includes same components for the CAN bus ∩2, and operates in the same manner in relation to the CAN bus ∩2.

Figure 4:
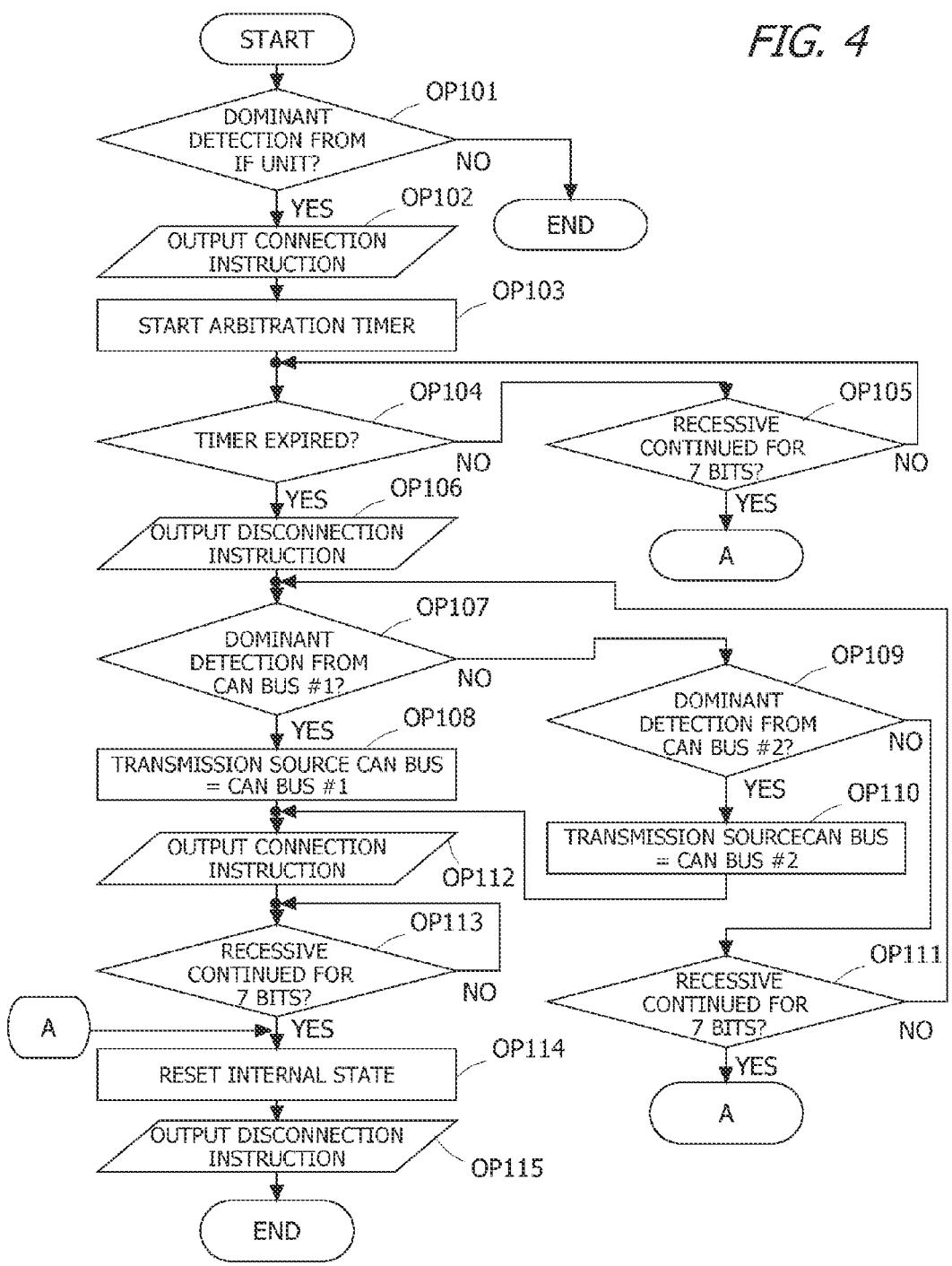
FIG. 4 is an example of a flowchart of a process by the control unit.

FIG. 4 is an example of a flowchart of a process by the control unit 10. The process by the control unit 10 is repeated every predetermined period of time. The process illustrated in FIG. 4 is a process that is performed by the control unit 10 in the case where the control unit 10 is formed by the electronic circuit illustrated in FIGS. 2 and 3. Furthermore, in the case where the control unit 10 is a processor such as a CPU, the process illustrated in FIG. 4 may be said to be a process that is performed by execution of a predetermined program by the control unit 10.

In OP101, the control unit 10 determines whether the notification about detection of the dominant state of a target CAN bus is input from one of the interface units 11. Determination in OP101 is determination of whether transmission of a CAN frame is started or not. In the case where determination in OP101 is affirmative determination, the process proceeds to OP102. In the case where determination in OP101 is negative determination, the process illustrated in FIG. 4 is ended.

In OP102, the control unit 10 outputs the connection instruction to the bus connection unit 15. The CAN bus ∩1 and the CAN bus ∩2 are thereby connected by the bus connection unit 15, and a signal of the CAN frame transmitted from a device connected to one of the CAN buses is transmitted to the CAN bus ∩1 and the CAN bus ∩2.

In OP103, the control unit 10 starts the arbitration timer (period corresponding to 13 bits). In OP104, whether the arbitration timer expired or not is determined. When the arbitration timer expires (OP104: YES), the process proceeds to OP106. The process proceeds to OP105 until the arbitration timer expires (OP104: NO).

In OP105, whether the recessive state is continued for a time length corresponding to 7 bits or not is determined. The process in OP105 corresponds to operation of the binary counter of the end detection unit 122A in FIG. 2, for example. In the case where the recessive state is continued for the time length corresponding to 7 bits (OP105: YES), the process proceeds to OP114. In the case where a duration of the recessive state does not reach the time length corresponding to 7 bits (OP105: NO), the process proceeds to OP104.

In OP106, the control unit 10 detects end of the arbitration, and outputs the disconnection instruction to the bus connection unit 15. The CAN bus ∩1 and the CAN bus ∩2 are thereby disconnected by the bus connection unit 15.

In OP107, the control unit 10 determines whether the notification about detection of the dominant state of the CAN bus ∩1 is input from the interface unit 11A or not. In the case where determination in OP107 is affirmative determination, the process proceeds to OP108. In OP108, the control unit 10 identifies the CAN bus ∩1 as the transmission source CAN bus of the CAN frame. In the case where determination in OP107 is negative determination, the process proceeds to OP109.

In OP109, the control unit 10 determines whether the notification about detection of the dominant state of the CAN bus ∩2 is input from the interface unit 11B or not. In the case where determination in OP109 is affirmative determination, the process proceeds to OP110. In OP110, the control unit 10 identifies the CAN bus ∩2 as the transmission source CAN bus of the CAN frame. In the case where determination in OP109 is negative determination, the process proceeds to OP111.

In OP111, the control unit 10 determines whether the recessive state is continued for a time length corresponding to 7 bits or not. In the case where the recessive state is continued for the time length corresponding to 7 bits (OP111: YES), the process proceeds to OP114. In the case where a duration of the recessive state does not reach the time length corresponding to 7 bits (OP111: NO), the process proceeds to OP107.

In OP112, the control unit 10 outputs the connection instruction to the bus connection unit 15. The CAN bus ∩1 and the CAN bus ∩2 that were disconnected in OP106 after end of the arbitration are thereby connected again. In OP113, the control unit 10 determines whether the recessive state is continued for a time length corresponding to 7 bits or not. In the case where the recessive state is continued for the time length corresponding to 7 bits (OP113: YES), the process proceeds to OP114. In the case where a duration of the recessive state does not reach the time length corresponding to 7 bits (OP113: NO), the process in OP113 is performed again.

In OP114, because end of transmission of the CAN frame or end of transmission of an error frame is detected, the control unit 10 resets an internal state of the control unit 10. In OP114, the state of each D-FF in FIGS. 2 and 3 is reset, for example. In OP115, the control unit 10 outputs the disconnection instruction to the bus connection unit 15. The CAN bus ∩1 and the CAN bus ∩2 are thereby disconnected.

Advantages and Effects of First Embodiment

In the first embodiment, the transmission source detection device 1 connected to the CAN bus ∩1 and the CAN bus ∩2 identifies, as the transmission source CAN bus, the CAN bus for which the dominant state is detected first after the arbitration is ended after transmission of the CAN frame is started. Accordingly, which of the CAN bus ∩1 and the CAN bus ∩2 is the CAN bus to which the transmission source device of the CAN frame is connected may be identified.

In the first embodiment, when the dominant state of one of the CAN buses is detected, the transmission source detection device 1 connects the CAN bus ∩1 and the CAN bus ∩2. The CAN frame that is transmitted from a device that is connected to one of the CAN buses is thereby also transmitted to the other CAN bus. Furthermore, the connection between the CAN bus ∩1 and the CAN bus ∩2 is temporarily disconnected after end of the arbitration, but when it is then first detected that one of the CAN buses is placed in the dominant state, the CAN bus ∩1 and the CAN bus ∩2 are connected again. The transmission source detection device 1 may thus identify the CAN bus to which the transmission source device of the CAN frame is connected, without interrupting CAN communication through the CAN bus.

By dividing the CAN bus into the CAN bus ∩1 and the CAN bus ∩2, and connecting the transmission source detection device 1 to each of the CAN bus ∩1 and the CAN bus ∩2 and forming the same by an electronic circuit as illustrated in FIGS. 2 and 3, a device that has a simple configuration and that is highly resistant to magnetic noise may be obtained. Furthermore, for example, if the CAN bus ∩1 and the CAN bus ∩2 remain connected to each other when the arbitration is ended, and the transmission source CAN bus is identified by measuring current, the dominant state is possibly detected for both the CAN bus ∩1 and the CAN bus ∩2 due to measurement of current not being fast enough for a propagation speed of an electric signal. In the first embodiment, the CAN bus ∩1 and the CAN bus ∩2 are temporarily disconnected after the arbitration is ended, and thus, the transmission source CAN bus may be more accurately identified by a simpler configuration.

Example Application 1 of Detection Result of Transmission Source CAN Bus

Figure 5:
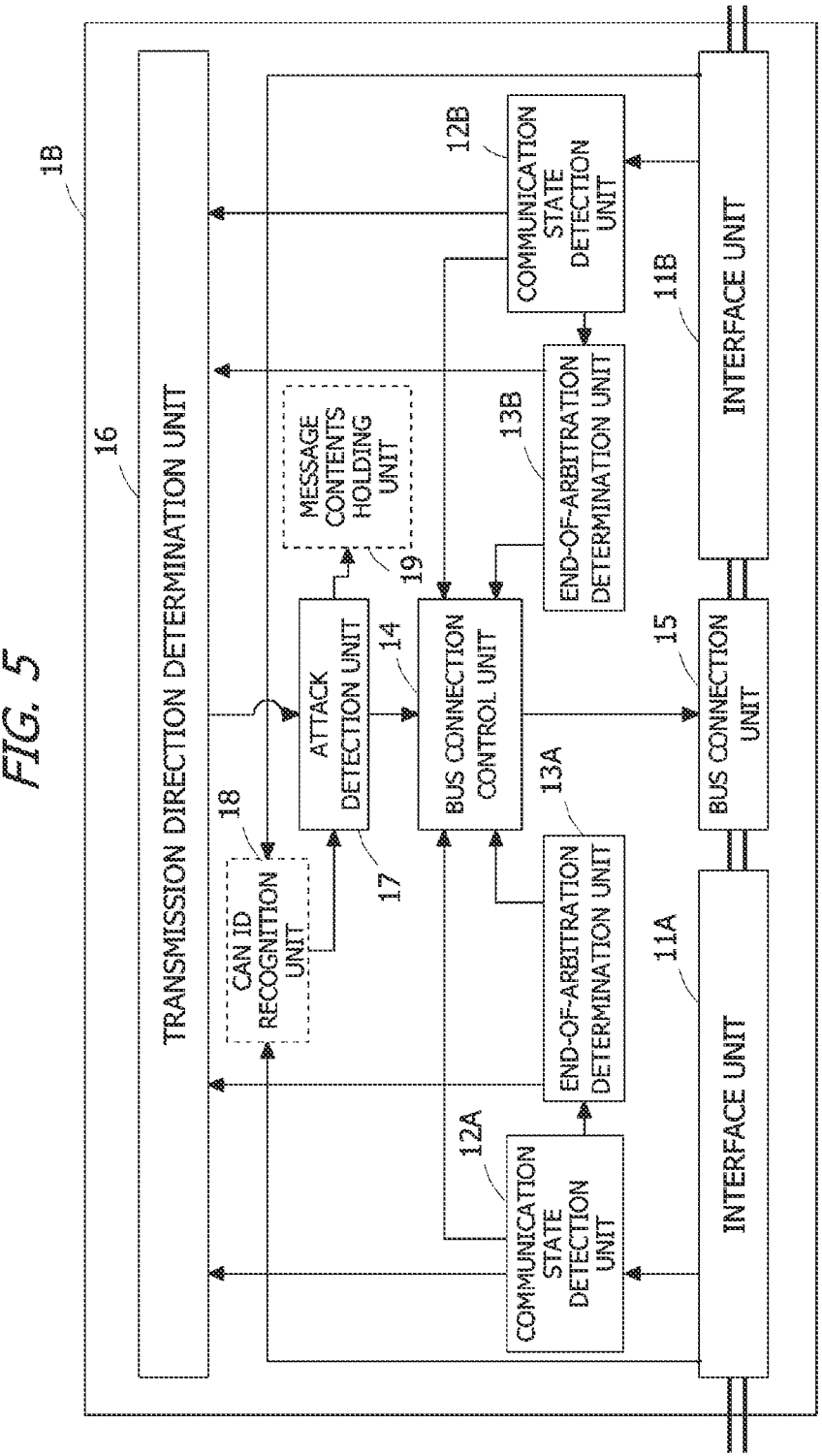
FIG. 5 is an example of a configuration of a transmission source detection device that uses a detection result of the transmission source CAN bus.

FIG. 5 is an example of a configuration of a transmission source detection device 1B that uses a detection result of the transmission source CAN bus. The transmission source detection device 1B further includes an attack detection unit 17 in addition to the components of the transmission source detection device 1. Additionally, in FIG. 5, the transmission source detection device 1B further includes a CAN ID recognition unit 18 and a message contents holding unit 19, but these are components that are adopted in subsequent example applications.

The attack detection unit 17 receives input of information about the transmission source CAN bus from the transmission direction determination unit 16. The attack detection unit 17 determines whether a CAN frame that is transmitted is an attacking frame or not, based on the information about the transmission source CAN bus. For example, in the case where information about the transmission source CAN bus indicates, as the transmission source CAN bus, a CAN bus where transmission of a CAN frame is not supposed to occur, the attack detection unit 17 determines that the CAN frame is an attacking frame.

In the case of determining that the CAN frame that is transmitted is an attacking CAN frame, the attack detection unit 17 outputs a notification about occurrence of an attack to the bus connection control unit 14. When the notification about occurrence of an attack is received from the attack detection unit 17, the bus connection control unit 14 outputs the disconnection instruction to the bus connection unit 15. Additionally, output of the disconnection instruction following the notification about occurrence of an attack is performed preferentially to other functions of the bus connection control unit 14. Accordingly, further attacks may be prevented by disconnecting the connection between the CAN bus ∩1 and the CAN bus ∩2.

As an example of a threat scenario that is conceivable in relation to example application 1 described above, there may be cited a case where, in a vehicle-mounted system including an ECU that monitors the CAN bus and an ECU that does not transmit the CAN frame in modes other than a mode such as debug, for example, an attacking CAN frame is transmitted from such an ECU due to the ECU being attacked. In this case, the transmission source detection device 1B may detect transmission of a CAN frame from the ECU, and may prevent further attacks from continuing.

Example Application 2 of Detection Result of Transmission Source CAN Bus

In example application 2 of a detection result of the transmission source CAN bus, the transmission source detection device 1B further includes the attack detection unit 17 and the CAN ID recognition unit 18. The CAN ID recognition unit 18 acquires contents of a CAN frame from each of the interface unit 11A and the interface unit 11B. Furthermore, the CAN ID recognition unit 18 acquires a CAN ID from a CAN frame that is acquired, and outputs the same to the attack detection unit 17.

Figure 6:
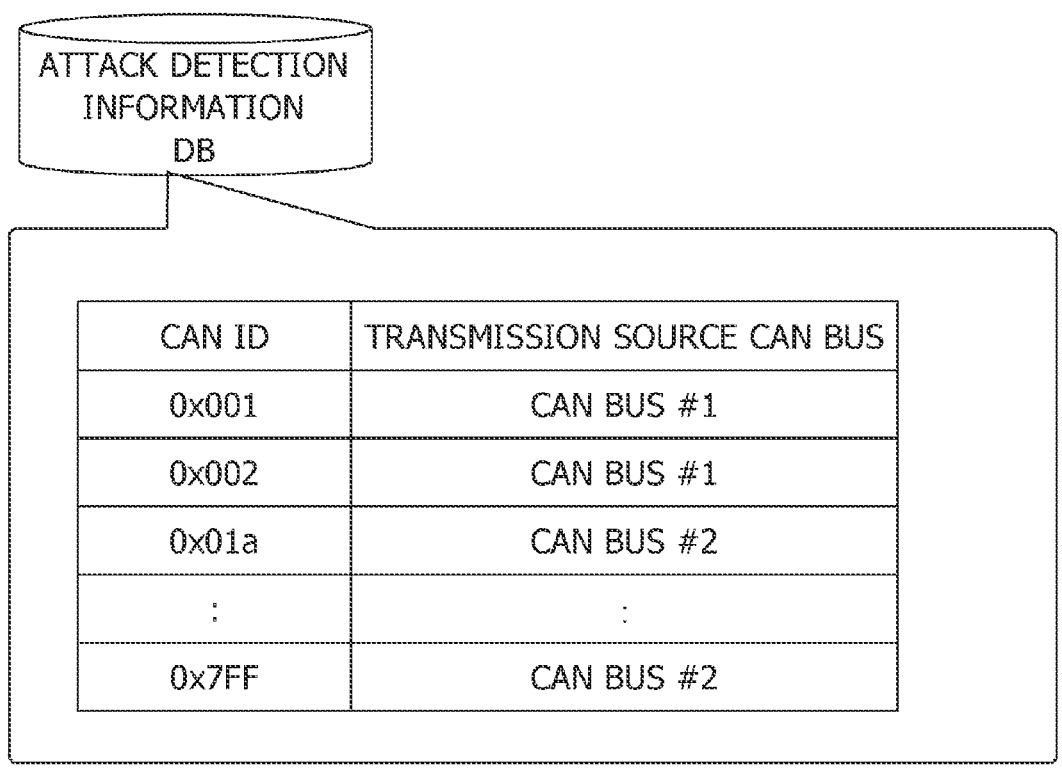
FIG. 6 is an example of the database associating the CAN ID and information about the transmission source CAN bus.

The attack detection unit 17 includes a database associating a CAN ID and information about the transmission source CAN bus of the CAN frame including the CAN ID. FIG. 6 is an example of the database associating the CAN ID and information about the transmission source CAN bus. The database is held in a memory provided in the attack detection unit 17, or in the case where the control unit 10 is a processor, the database is held in a memory or an auxiliary storage device provided in the transmission source detection device 1B.

The attack detection unit 17 determines whether information associating the CAN ID acquired from the CAN ID recognition unit 18 and information about the transmission source CAN bus acquired from the transmission direction determination unit 16 is included in the database held in the attack detection unit 17 or not. In the case where the information associating the CAN ID acquired from the CAN ID recognition unit 18 and information about the transmission source CAN bus acquired from the transmission direction determination unit 16 is not included in the database held in the attack detection unit 17, the attack detection unit 17 determines that the CAN frame, start of transmission of which is detected, is an attacking CAN frame, and outputs the notification about occurrence of an attack to the bus connection control unit 14. As in example application 1, the bus connection control unit 14 receives the notification about occurrence of an attack, and outputs the disconnection instruction to the bus connection unit 15.

According to example application 2, in the case of an attack that can be determined based on the CAN ID of a CAN frame and the transmission source CAN bus, the CAN buses may be disconnected and further attacks may be prevented.

As an example of a threat scenario that is conceivable in relation to example application 2 described above, there may be cited a case where, in a vehicle-mounted system where a first ECU group related to vehicle operation and a second ECU group supporting ECUs in the first ECU group are connected to one CAN bus, there is an attack from the second ECU group side. In this case, the transmission source detection device 1B is disposed on the CAN bus between the first ECU group and the second ECU group. When an attacking CAN frame from the second ECU group side is detected, the transmission source detection device 1B may block all the CAN frames from the second ECU group side to protect the first ECU group from further attacks from the second ECU group side.

As an example of the threat scenario that is conceivable in relation to example application 2 described above, there may be cited a case where a communication ECU including a function of communicating with outside the vehicle-mounted system transmits an attacking CAN frame to inside the vehicle-mounted system as a result of being attacked from outside the vehicle-mounted system. In this case, the transmission source detection device 1B is disposed on a CAN bus between the communication ECU and other ECUs. When an attacking CAN frame from the communication ECU side is detected, the transmission source detection device 1B may block all the CAN frames from the communication ECU side to protect other ECUs connected to the CAN bus from further attacks.

Additionally, in example applications 1 and 2, the attack detection unit 17 may end output of the notification about occurrence of an attack every time transmission of the CAN frame is completed. Thereby, the transmission source detection device 1B blocks the CAN bus, limiting to while the attacking CAN frame is being received, and may prevent the CAN frame from passing through the transmission source detection device 1B, limiting to when the CAN frame is an attacking CAN frame. Furthermore, because transmission of the attacking CAN frame seems successful to an attacker, an attack may be prevented without the attacker grasping failure of the attack.

Alternatively, in example applications 1 and 2, when detecting an attacking CAN frame, the attack detection unit 17 may transmit an error frame to the CAN bus. Flow of an attacking CAN frame to the CAN bus to which the transmission source device of the attacking CAN frame is connected may thereby also be prevented.

Example Application 3 of Detection Result of Transmission Source CAN Bus

In example application 3 of a detection result of the transmission source CAN bus, the transmission source detection device 1B further includes the attack detection unit 17, the CAN ID recognition unit 18, and the message contents holding unit 19.

The message contents holding unit 19 saves, in a memory, the CAN ID of a CAN frame that is determined by the attack detection unit 17 to be an attacking CAN frame and information about the transmission source CAN bus of the CAN frame in association with each other. Information that may lead to a transmission source device of an attacking CAN frame occurring in past may thereby be held, and information that helps investigate an attack may be obtained.

Other Embodiments

The embodiments described above are examples, and the present disclosure may be changed and carried out as appropriate without departing from the gist of the present disclosure.

In the first embodiment, an example is described where the transmission source detection device divides the CAN bus into two buses of the CAN bus ∩1 and the CAN bus ∩2; however, the transmission source detection device 1 may also divide the CAN bus into three or more buses. That is, the transmission source detection device 1 may be connected to three or more CAN buses. In this case, the transmission source detection device 1 includes a set of the interface unit 11, the communication state detection unit 12, and the end-of-arbitration determination unit 13 for each CAN bus that is connected.

The processes and means described in the present disclosure may be freely combined to the extent that no technical conflict exists.

A process which is described to be performed by one device may be performed among a plurality of devices. Processes described to be performed by different devices may be performed by one device. Each function to be implemented by a hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. A device comprising:
   a first interface unit connected to a first controller area network (CAN) bus;
   a second interface unit connected to a second CAN bus; and
   a control unit configured to identify, in a case where transmission of a CAN frame is started, a CAN bus detected to be in a dominant state first after end of arbitration from the first CAN bus or the second CAN bus, as a CAN bus to which a transmission source device of the CAN frame is connected.

2. The device according to claim 1, further comprising a connection unit configured to perform connection and disconnection between the first interface unit and the second interface unit, wherein
   the control unit is configured to
      output a connection instruction to the connection unit in a case where transmission of the CAN frame is started,
      output a disconnection instruction to the connection unit in a case where end of the arbitration is detected, and
      then output the connection instruction to the connection unit in a case where the dominant state of the first CAN bus or the second CAN bus is detected.

3. The device according to claim 1, wherein the control unit is configured to detect end of the arbitration for the CAN frame based on lapse of a time length corresponding to 13 bits after detection of start of transmission of the CAN frame.

4. The device according to claim 2, wherein, in a case where the first CAN bus or the second CAN bus that is identified as a CAN bus to which a transmission source device of a first CAN frame is connected is not registered as a legitimate CAN bus for transmission of the first CAN frame, the control unit is configured to outputs the disconnection instruction to the connection unit.

5. A method performed by a device connected to a first controller area network (CAN) bus and a second CAN bus, the method comprising:
   detecting start of transmission of a CAN frame; and
   identifying, in a case where transmission of the CAN frame is started, a CAN bus detected to be in a dominant state first after end of arbitration from the first CAN bus or the second CAN bus, as a CAN bus to which a transmission source device of the CAN frame is connected.

* * * * *